(12) United States Patent
Klöhn (10) Patent No.: US 10,838,941 B2
(45) Date of Patent: Nov. 17, 2020

(54) AUTOMATED IMAGE-BASED RECORD CREATION AND RELATED DATABASE SYSTEMS

(71) Applicant: salesforce.com, inc., San Francisco, CA (US)

(72) Inventor: Martin Klöhn, Dublin (IE)

(73) Assignee: salesforce.com, inc., San Francisco, CA (US)

( * ) Notice: Subject to any disclaimer, the term of this patent is extended or adjusted under 35 U.S.C. 154(b) by 218 days.

(21) Appl. No.: 15/622,893

(22) Filed: Jun. 14, 2017

(65) Prior Publication Data

US 2018/0365278 A1 Dec. 20, 2018

(51) Int. Cl.
| | | |
|---|---|---|
| *G06F 16/22* | (2019.01) | |
| *G06F 16/583* | (2019.01) | |
| *G06K 9/00* | (2006.01) | |
| *G06F 16/51* | (2019.01) | |
| *G06F 16/23* | (2019.01) | |
| *G06N 3/08* | (2006.01) | |
| *G06N 3/00* | (2006.01) | |
| *G06K 9/62* | (2006.01) | |

(52) U.S. Cl.
CPC ...... *G06F 16/2282* (2019.01); *G06F 16/2379* (2019.01); *G06F 16/51* (2019.01); *G06F 16/583* (2019.01); *G06K 9/00671* (2013.01); *G06K 9/627* (2013.01); *G06K 9/6256* (2013.01); *G06N 3/006* (2013.01); *G06N 3/08* (2013.01); *G06K 2209/27* (2013.01)

(58) Field of Classification Search
CPC .. G06F 16/2282; G06F 16/2379; G06F 16/51; G06F 16/583; G06K 9/00671; G06K 9/627; G06K 9/6256; G06K 2209/27; G06N 3/006; G06N 3/08; G06T 7/00; G06T 7/0002; G06T 7/0004; G06T 7/0012

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

*Primary Examiner* — Robert W Beausoleil, Jr.
*Assistant Examiner* — Mohammad Solaiman Bhuyan
(74) *Attorney, Agent, or Firm* — LKGlobal | Lorenz & Kopf, LLP (57) ABSTRACT

Database systems and related methods are provided for creating database records in response to submitted media content, such as an image. One exemplary method involves a server receiving an image from a client device coupled to a network, analyzing the image at the server to characterize one or more attributes of the image, automatically populating one or more fields of a data record corresponding to the image to reflect the characterized one or more attributes of the image, and storing the data record in a database coupled to the server. In one or more exemplary embodiments, metadata and validation rules associated with a database object type are utilized to automatically populate fields of the new record in conjunction with the characterized image attributes.

20 Claims, 7 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,965,112 B1 * | 2/2015 | Ibarz .................... G06K 9/6256 382/105 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2008/0295010 A1 * | 11/2008 | Bobbitt .................... G06F 16/58 715/764 |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0086544 A1 * | 4/2012 | Kemp .................... G06F 9/5072 340/5.1 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0072173 A1 * | 3/2014 | Haas .................... G06T 7/74 382/103 |
| 2014/0294239 A1 * | 10/2014 | Duckett .................... G06K 9/6228 382/103 |
| 2018/0107684 A1 * | 4/2018 | Kiapour .................... G06N 3/08 |

(56) References Cited

U.S. PATENT DOCUMENTS

2018/0225812 A1* 8/2018 Diverdi ............... G06K 9/4628
2018/0322366 A1* 11/2018 Lim .................... G06K 9/6256
2018/0342069 A1* 11/2018 Lim .................... G06T 7/0008

* cited by examiner

AUTOMATED IMAGE-BASED RECORD CREATION AND RELATED DATABASE SYSTEMS

TECHNICAL FIELD

Embodiments of the subject matter described herein relate generally to database systems, and more particularly, to methods and systems that support automated creation of database records in a database system based on images or other forms of content submitted to the database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Cloud-based architectures and file hosting services have been developed to improve collaboration, integration, and cooperation among users. For example, any number of users can interact with data or applications associated with an organization or tenant from any number of remote locations, and from any number of potential types of devices. Increasingly, remote users are utilizing mobile phones, smartphones, tablets, and the like to interact with cloud-based applications and databases. Depending on the particular device configuration, manually data entry can be unwieldy or time consuming. Accordingly, it is desirable to provide methods and systems that facilitate data submission with in a more automated manner to reduce the time and effort required by individual users.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for automatically creating data records in a database system in response to the submission of media content to the database system. As described in greater detail below, the submitted media content is analyzed using classification algorithms, neural networks or other artificial intelligence to characterize one or more attributes of the media content, and the characterized attributes, in turn, are then utilized to automatically populate one or more fields of a data record to be created corresponding to the media content. Thus, one or more fields of the resulting database record reflect the characterized attributes of the submitted media content associated with the database record. For purposes of explanation, the subject matter may be described herein in the context of the submitted media content being realized as an image file, picture, photograph or variants thereof; however, the subject matter is not limited to images and may be employed in an equivalent manner for other types of media content (e.g., video or other multimedia content, and the like).

As described in greater detail below, in exemplary embodiments, a user uploads or otherwise submits an image file or other suitable media content file to a database system over a network. The image is then analyzed at a server of the database system to characterize or otherwise identify one or more attributes of the image, such as, for example, the subject or content of the image, the physical characteristics of the captured content, and/or other descriptive information pertaining to the image. In this regard, neural networks or other types of artificial intelligence may be applied to the uploaded image to perform object detection, object recognition, object classification, fault detection, and other operations for discerning attributes of the content captured by the uploaded image. The characterized image attributes are then utilized to automatically populate fields of a data record to be associated with the uploaded image. In other words, the autopopulated fields of the data record reflect the characterized attributes of the image. In one or more embodiments, validation rules or other metadata associated with the database object type for the record to be created are also utilized to automatically populate additional fields of the record. Additional related data records may also be automatically created based on the characterized attributes assigned to the data record corresponding to the image.

In one or more exemplary embodiments, a case database record is automatically created in response to a user uploading or submitting an image for a new case. For example, remote customer service personnel may take one or more photographs of a damaged or defective product and upload the image(s) to a database system to create a new case record corresponding to that particular instance of the product. A server of the database system then analyzes the image(s) to identify the product or object depicted in the image(s), along with the physical characteristics and condition of the object, including quantification or characterization of the nature of the damage or defect depicted. To this end, the server may employ artificial intelligence and neural network fault detection using a training data set containing other images of the same or similar products to characterize attributes of the depicted product in the uploaded image(s). In this regard, the training data set may be specific to products associated with a particular user, a particular group of users, a particular organization, a particular tenant, or the like, and in some embodiments, the training data set may include previously-created autopopulated case database records and their associated images.

The server may then automatically populate fields of a case database record to be created in association with the uploaded image(s) using the characterized attributes identifying the product depicted, describing the condition of the depicted product, and so on. Additionally, the server may utilize validation rules or other metadata associated with the case database object type to automatically populate additional fields of the case database record. Once the case database record is stored or otherwise instantiated in the database, various workflows may be applied to the new case database record to perform additional actions or create additional database records related to the new case database record. For example, the new case may be automatically assigned to a particular user or group of users for follow up, or in the case of a damaged or defective product, an order for a new replacement product or replacement part(s) may be automatically created using the characterized attributes for the condition of the depicted product. Accordingly, a remote user may quickly and conveniently create a new case record and initiate additional corresponding actions merely by uploading one or more images corresponding to the case, and with minimal manual data entry or other additional manual input required.

Figure 1:
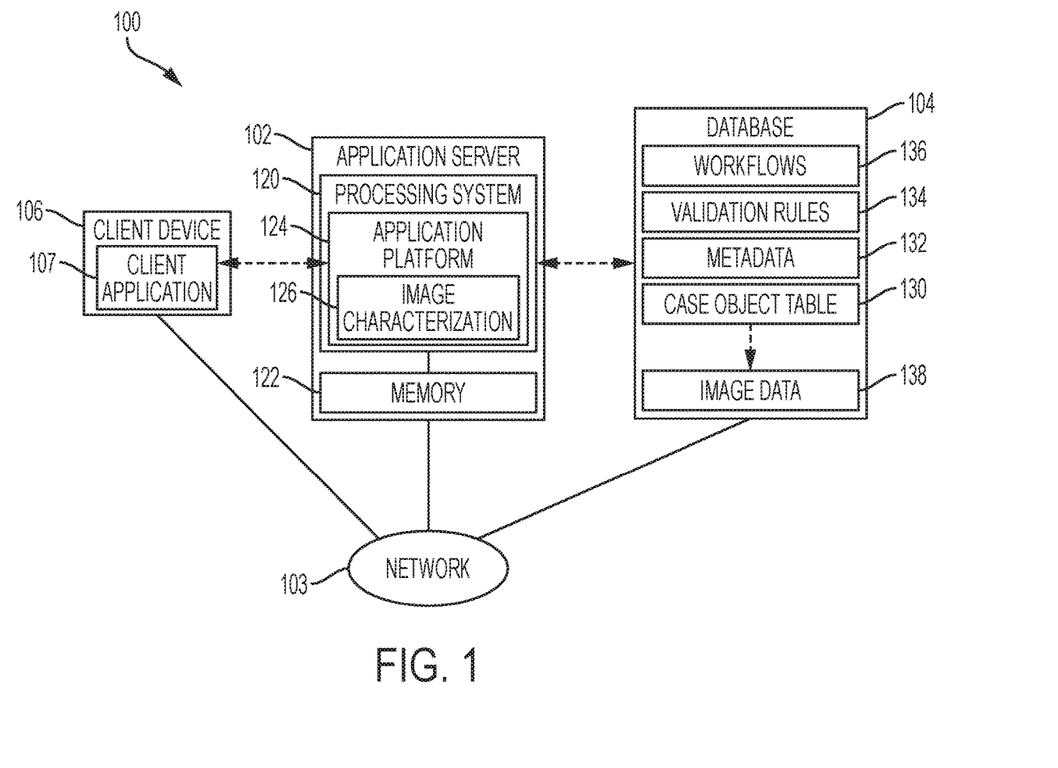
FIG. 1 is a block diagram of an exemplary computing system.

FIG. 1 depicts an exemplary embodiment of a database system 100 capable of automatically creating data records in a database 104 in response to a user of a client device 106 uploading or otherwise submitting media content to a server 102 over a communications network 103, which may be realized as any sort or combination of wired and/or wireless computer network, a cellular network, a mobile broadband network, a radio network, the Internet, or the like. For purposes of explanation, the subject matter is described herein in the context of the media content being realized as one or more images captured by the client device 106; however, it should be appreciated the subject matter described herein is not limited to images and may be implemented in an equivalent manner for other types of media content.

The server 102 generally represents a computing device, computing system or another combination of processing logic, circuitry, hardware, and/or other components configured to support the resource visualization processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof.

In one or more embodiments, the programming instructions cause the processing system 120 to create, generate, or otherwise facilitate the application platform 124 that generates or otherwise provides instances of a virtual application at run-time (or "on-demand") based at least in part upon code and other data that is stored or otherwise maintained by the memory 122 and/or the database 104. Accordingly, for purposes of explanation, the server 102 may alternatively be referred to herein as an application server. In exemplary embodiments, the programming instructions also cause the processing system 120 to create, generate, or otherwise facilitate an image characterization application 126 that supports characterizing attributes of an uploaded image for automatically populating fields of a corresponding database record, as described in greater detail below. Depending on the embodiment, the image characterization application 126 may be integrated with the virtual application or implemented as a standalone application or process at the server 102.

The client device 106 generally represents an electronic device coupled to the network 103 that may be utilized by a user to interact with the server 102 and/or the database 104 and upload or otherwise submit images for storage or maintenance in the database 104. In practice, the client device 106 can be realized as any sort of personal computer, mobile telephone, tablet or other network-enabled electronic device. The client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. In one or more exemplary embodiments, the client device 106 also includes a camera, an image sensor, or the like capable of capturing images responsive to inputs by the user. The illustrated client device 106 executes or otherwise supports a client application 107 that communicates with the application platform 124 on the application server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like, to access or otherwise initiate an instance of the virtual application presented on the client device 106.

In exemplary embodiments, the database 104 stores or otherwise maintains data for integration with or invocation by a virtual application in instances of objects (e.g., records or rows) organized in various object tables. For example, the database 104 may include a plurality of different object tables configurable to store or otherwise maintain alphanumeric values, metadata, or other descriptive information that define a particular instance of a respective type of object associated with a respective object table. The virtual application may support a number of different types of objects that may be incorporated into or otherwise depicted or manipulated by the virtual application, with each different type of object having a corresponding object table that includes columns or fields corresponding to the different parameters or criteria that define a particular instance of that object.

For purposes of explanation, the subject matter is described herein in the context of a case database object type, wherein instances of case database objects are maintained in a case database object table 130 with the structure and content of the columns or fields being defined by case object metadata 132 maintained in the database 104. Additionally, one or more validation rules 134 associated with the case database object type may be stored or otherwise maintained in the database 104, along with one or more workflows 136 that may be applied or otherwise performed in response to creation, changes, or updates to a case record in the case object table 130. In exemplary embodiments described herein, the database 104 also stores or maintains images 138 that have been previously submitted for association with a corresponding case record in the case object table 130.

As described in greater detail below, in one or more exemplary embodiments, in response to receiving an image submitted or uploaded by the client device 106, the application server 102 automatically creates a new case record (alternatively, a new instance of a case database object) corresponding to the image. The image characterization application 126 at the application server 102 automatically characterizes attributes of the image, and then the application server 102 automatically populates one or more fields of the new case record using the characterized attributes in conjunction with the metadata 132 and/or validation rules 134 associated with the case object type. In this regard, the metadata 132 may be utilized to identify which particular field of the new case record should be populated with a particular characterized attribute of the image, and the validation rules 134 may be utilized to modify or otherwise adjust values for one or more fields of the new case record to satisfy applicable validation criteria.

After automatically populating fields of the new case record, in exemplary embodiments, the application server 102 and/or application platform 124 generates or otherwise provides a graphical representation of the new case record on the client device 106 (e.g., within the client application 107) for user confirmation or approval. In this regard, the graphical representation indicates the autopopulated values for the fields of the new case record. The graphical representation may be provided within a graphical user interface (GUI) display that includes one or more GUI elements that allow the user of the client device 106 to review, analyze, and/or modify values for one or more fields of the new case record, along with a selectable GUI element (e.g., a button or the like) that allows the user to confirm or approve the new case record for submission or storage in the database 104.

In response to receiving user input confirming the creation of the new case record, the application server 102 and/or application platform 124 stores the uploaded image at a particular location in the database 104 and stores the new case record in the case object table 130. In this regard, a new row or record is added to the case object table 130 with one or more identifiers corresponding to the new case record, and with values for one or more columns or fields of the row being set to the autopopulated values. Additionally, an image field of the new case record may include the location of the uploaded image within the image data 138 stored by the database 104, thereby associating the new case record with the uploaded image. After storing the new case record in the database 104, one or more workflows 136 associated with the case database object type may be automatically applied to the new case record by the application server 102 and/or the database 104 to automatically perform one or more actions based on one or more fields of the new case record, as described in greater detail below.

Figure 2:
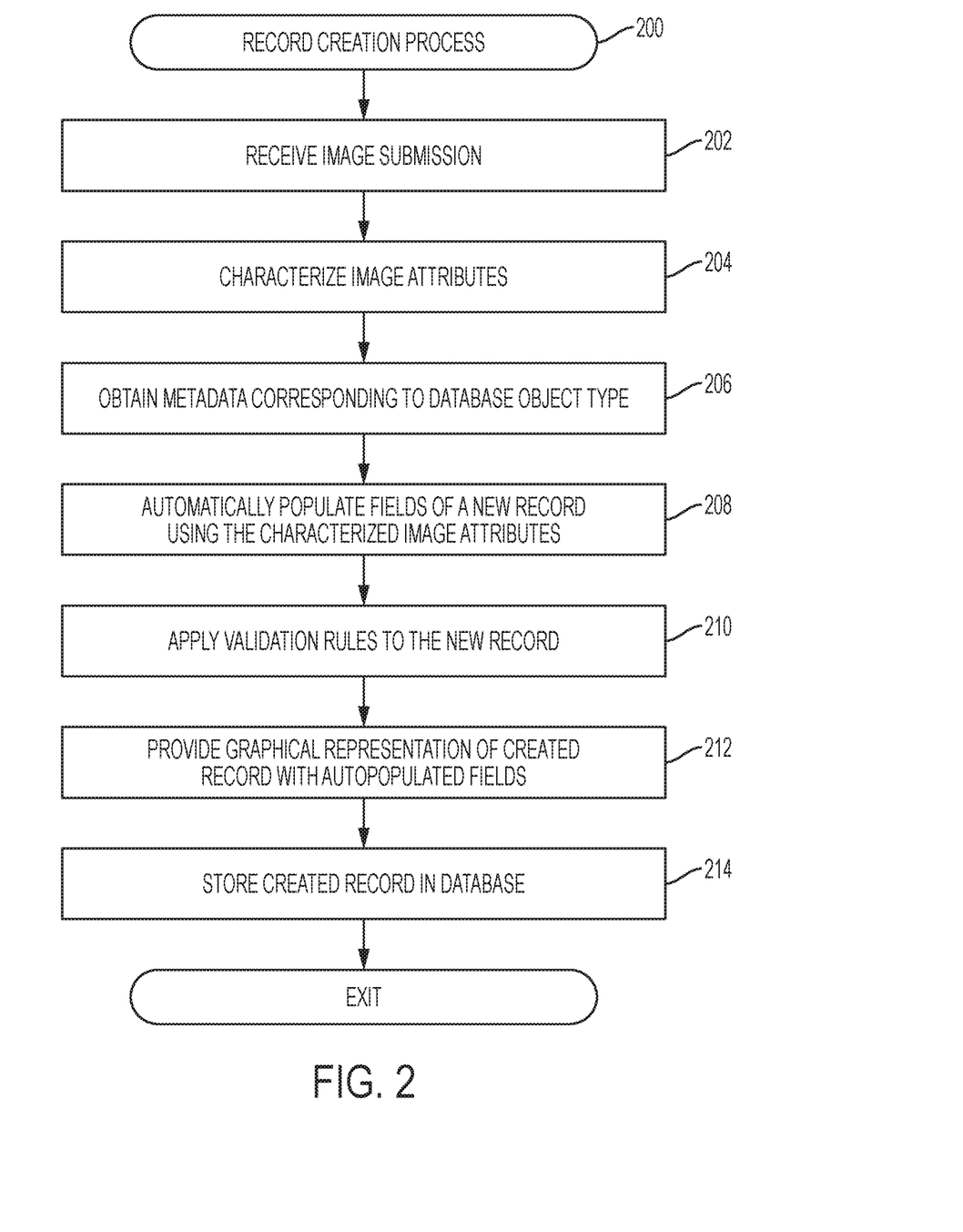
FIG. 2 is a flow diagram of an exemplary record creation process suitable for implementation in the computing system of FIG. 1 in accordance with one or more embodiments.

FIG. 2 depicts an exemplary embodiment of a record creation process 200 for creating autopopulated database records in response to media content input to a database system. For illustrative purposes, the following description may refer to elements mentioned above in connection with FIG. 1. In this regard, while portions of the record creation process 200 may be performed by different elements of the database system 100, for purposes of explanation, the subject matter is described herein in the context of the record creation process 200 being primarily performed by the application server 102 and/or the application platform 124.

It should be appreciated that the record creation process 200 may include any number of additional or alternative tasks, the tasks need not be performed in the illustrated order and/or the tasks may be performed concurrently, and/or the record creation process 200 may be incorporated into a more comprehensive procedure or process having additional functionality not described in detail herein. Moreover, one or more of the tasks shown and described in the context of FIG. 2 could be omitted from a practical embodiment of the record creation process 200 as long as the intended overall functionality remains intact.

Referring to FIG. 2, and with continued reference to FIG. 1, the record creation process 200 begins by retrieving or otherwise obtaining media content submitted to the database system and analyzing the media content to characterize one or more attributes of the media content (tasks 202, 204). As described in greater detail below in the context of FIGS. 3-4, one or more GUI elements or displays may be provided at the client device 106 by the client application 107 that allow a user to capture or otherwise select an image that the user would like to store in the database 104 or otherwise have converted into a corresponding record in the database 104. A user may manipulate the GUI element(s) to capture an image using a camera of the client device 106, or alternatively, select an image stored at the client device 106 or another location on the network 103, and then upload or otherwise submit the image to the application server 102 over the network 103 to initiate the record creation process 200.

In response to receiving the image, the image characterization application 126 analyzes the image to quantify, qualify, identify, or otherwise characterize one or more attributes of the content of the image. For example, the image characterization application 126 may implement an artificial neural network model that is trained to recognize or otherwise identify various attributes of an input image. In this regard, the image characterization application 126 attempts to identify the subject(s) of the image and determine the physical condition or other physical attributes of the subject(s). As described in greater detail below in the context of FIGS. 4-5, in one or more embodiments, the image characterization application 126 implements neural network fault detection to recognize physical defects associated with the subject depicted in the image.

In one or more embodiments, the artificial neural network model or other image classification algorithms implemented by the image characterization application 126 are trained using existing image data 138 stored or otherwise maintained in the database 104. In this regard, using existing image data 138 along with the values for various fields of the existing case records in the case object table 130 (e.g., the subject field value, the description field value, the product identifier field value, and the like) associated with those images, the image characterization application 126 may be trained to map or otherwise correlate various physical features depicted in an input image to corresponding values. In one or more embodiments, the image characterization application 126 may be trained in a user-specific or tenant-specific manner to improve results. For example, for a particular user, the image characterization application 126 may select an appropriate training data set for the user that includes existing case records 130 and existing image data 138 that is associated with, accessible by, or relevant to that user (e.g., existing data associated with that user's associated tenant or organization) but excludes other case records or image data that is not associated with the user, inaccessible to the user, or otherwise not likely to be pertinent for the user. Thus, by way of example, an artificial neural network model implemented at the server 102 may be trained using only image data 138 corresponding to products which a user is or likely to be involved with and corresponding fields of other case records 130 associated with that user or that user's department, team, group, employer, or the like. That said, in other embodiments, the image classification models or algorithms implemented at the server 102 may be trained using other data sets retrieved via the network 103 or using big data techniques to provide the desired performance.

Still referring to FIG. 2, the record creation process 200 continues by retrieving or otherwise obtaining metadata defining the structure of the database object type to be created and then automatically populating fields of a new instance of the database object type by mapping the characterized attributes to the appropriate fields based on the metadata (tasks 206, 208). In some embodiments, the application server 102 and/or the application platform 124 identifies the type of database object to be created based on one or more of the characterized attributes of the uploaded image. In other embodiments, the type of database object to be created is selected or indicated by the user of the client device 106, or otherwise designated by default. The application server 102 and/or the application platform 124 retrieves the metadata 132 associated with the database object type to be created and then utilizes the description or other characteristics of the fields of the database object type to determine how to map the characterized image attributes to the object fields and thereby populate fields of an instance of that object type with the appropriate image attributes. Thereafter, the application server 102 and/or the application platform 124 automatically populates the new instance of the database object type by setting or otherwise assigning values for fields of the new instance using the mapping between those fields and the characterized attributes.

In the illustrated embodiment, the record creation process 200 also retrieves or otherwise obtains validation rules corresponding to the database object type to be created and then applies those validation rules to the new instance of the database object type to automatically populate or modify one or more fields of the new instance when one or more validation criteria are not satisfied (task 210). In this regard, the application server 102 and/or the application platform 124 retrieves the validation rules 134 associated with the database object type from the database 104 and applies the corresponding validation criteria to the new instance of the database object type to modify, set, or otherwise assign values for one or more fields of the new instance when they do not satisfy the validation criteria after being autopopulated. For example, one or more autopopulated field values may be mapped or otherwise modified to a value that is within a range or set of valid values for that particular field and thereby substituted for the original autopopulated value. In other situations, one or more fields of the new instance that were not autopopulated with characterized image attributes may be autopopulated by the application server 102 and/or the application platform 124 and set to a valid value prescribed by the validation rules, or the application server 102 and/or the application platform 124 may otherwise automatically assign values to those fields using the validation rules 134.

In exemplary embodiments, the record creation process 200 continues by generating or otherwise providing a graphical representation of the new instance of the database object to be created on the client device and storing or otherwise maintaining the new instance of the database object in the database (task 212, 214). In one or more embodiments, the storing of the new instance of the database object in the database 104 is conditional on receiving a user input indicative of acceptance or confirmation of the new instance of the database object type having autopopulated field values. For example, the application server 102 and/or the application platform 124 may generate or otherwise provide a GUI display depicting new instance of the database object type that lists the names of the fields of the database object type as provided by the object metadata 132 along with the corresponding values assigned to those fields based on the characterized image attributes. The autopopulated field values may be presented using text boxes or similar GUI elements that are manipulable by a user to modify or otherwise overwrite the values, and the GUI display may include a button or similar GUI element selectable by the user to confirm and thereby save the new instance of the database object in the database 104.

In response to receiving the confirmation, the application server 102 and/or the application platform 124 updates the object table 130 in the database 104 to include a new row or entry having the autopopulated field values. Additionally, the application server 102 and/or the application platform 124 may store the uploaded image at a particular location in the database 104 and then update the new record in the object table 130 by assigning a reference to the location where the corresponding image data 138 is stored in the database 104 to an image location field value of the entry.

In one or more embodiments, after instantiating the new database record in the database 104, one or more workflow rules 136 associated with that database object type are applied to initiate or otherwise perform one or more additional actions, which may be influenced by the autopopulated field values of the new database record. For example, an autopopulated field value may trigger creation of additional related records in the database 104, generating or otherwise providing a notification to the user of the client device 106 or one or more other users, or the like.

Figure 3:
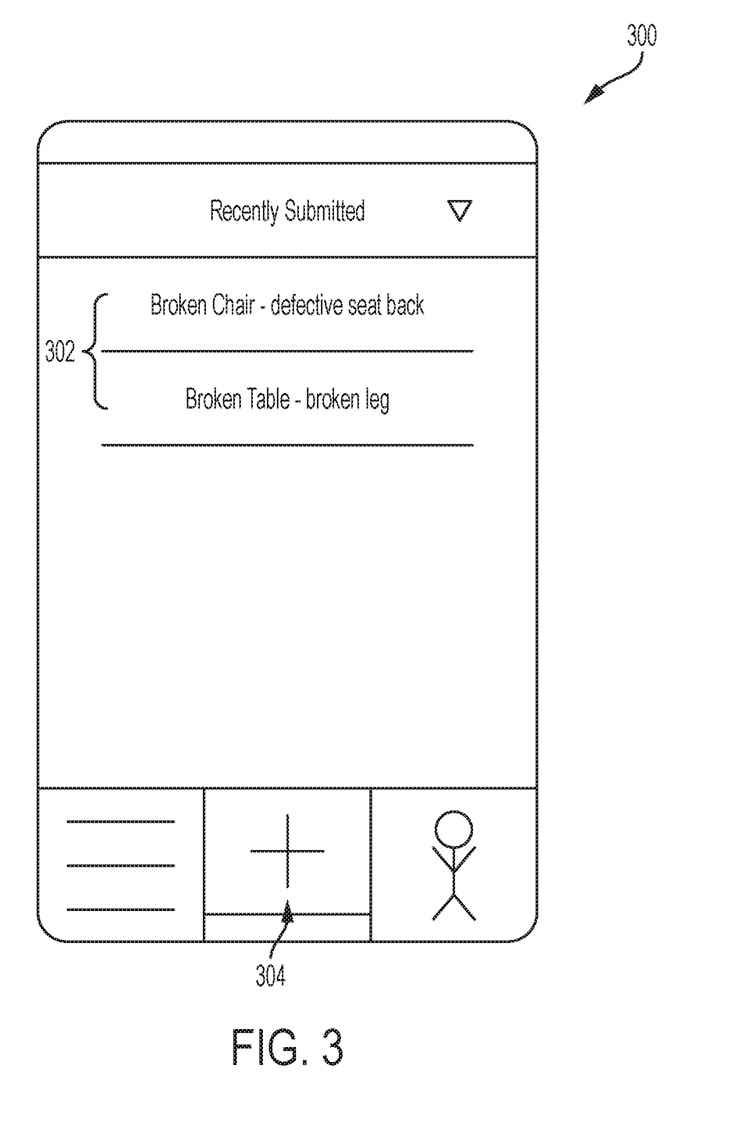
FIGS. 3-6 depicts an exemplary sequence of graphical user interface (GUI) displays illustrating the record creation process of FIG. 2 in accordance with one or more exemplary embodiments.

FIGS. 3-6 depict an exemplary sequence of GUI displays that may be presented on the client device 106 in connection with an exemplary embodiment of the record creation process 200. In one or more embodiments, the GUI displays are generated or otherwise provided by an instance of a virtual application provided by the application server 102 and/or the application platform 124 within the client application 107 on the client device 106. FIG. 3 depicts a GUI display 300 including a list 302 of case records associated with a user. In this regard, the application server 102 and/or application platform 124 may receive login credentials or other authentication information from the client device 106 via the network 103, authenticate the user, and then utilize a user ID or other identifier associated with the user to query the case object table 130 for case records associated with the user and generate a corresponding list 302 using a subset of the fields of the obtained case records (e.g., the subject and description fields). The case list GUI display 300 also includes a button or similar GUI element 304 to initiate uploading or otherwise submitting an image or other media content for conversion to a case record.

Figure 4:
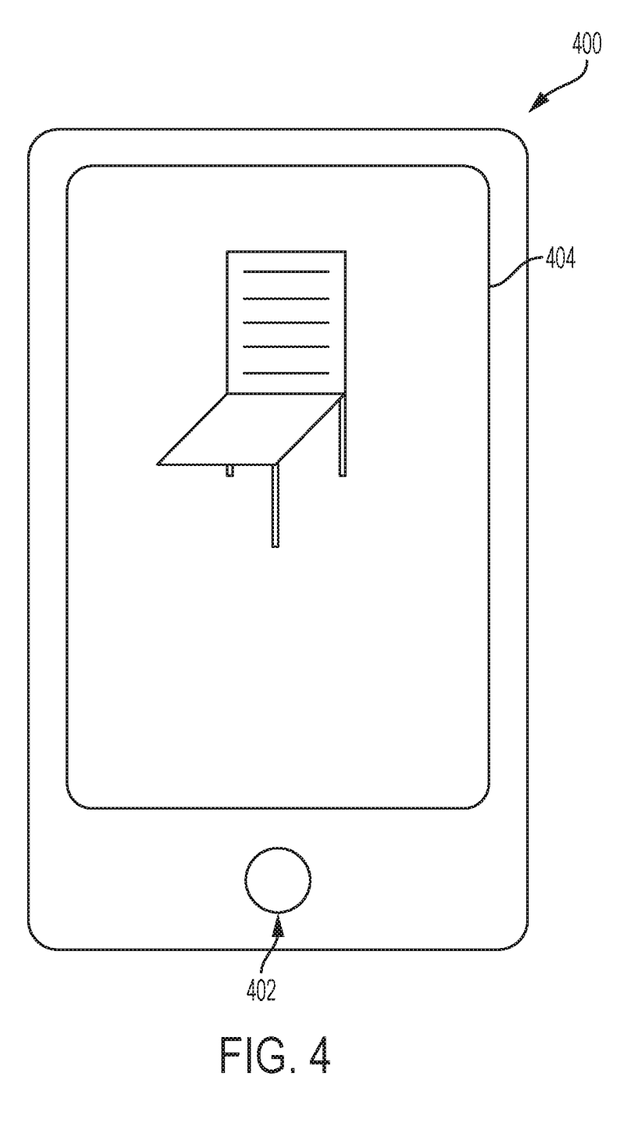

Referring now to FIGS. 3-4, in response to receiving a user input selecting the GUI element 304, an updated GUI display 400 may be presented on the client device 106 that includes a button or similar GUI element 402 and an image region 404 corresponding to the current field of view of a camera of the client device 106. The user may select or otherwise manipulate the button 402 to capture an image corresponding to the image region 404 via the camera and then transmit or otherwise upload the captured image to the application server 102 and/or application platform 124 via the network 103. In this regard, FIG. 4 depicts a captured image of a broken chair that is missing the right front leg.

Figure 5:
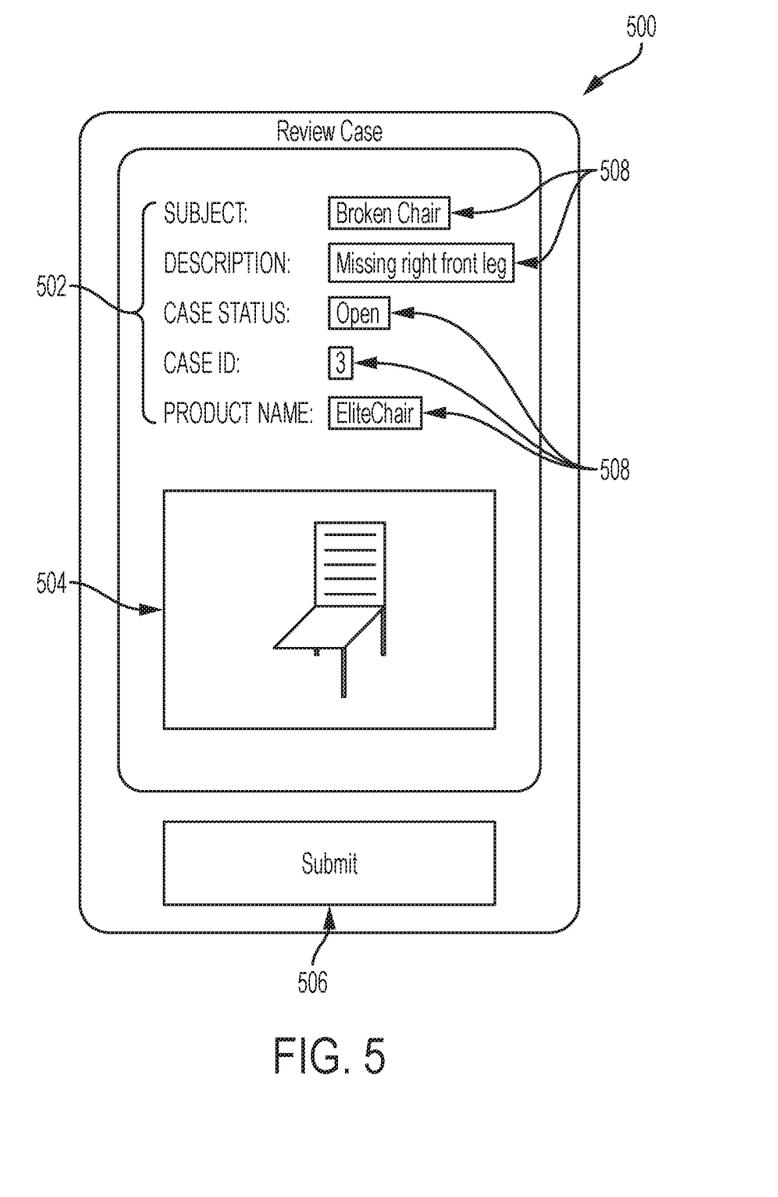

Referring now to FIGS. 4-5, in response to receiving the captured image 404, the image characterization application 126 analyzes the image to characterize one or more attributes of the content of the image 404. For example, the captured image 404 may be input to an artificial neural network model trained using data associated with the current user and/or a group including the user (e.g., using a tenant identifier, an organization identifier, or the like) which classifies the subject of the captured image 404 as a chair. The image characterization application 126 may identify or otherwise characterize the manufacturer of the chair, the model or product name for the chair, the color(s) of the chair, the physical condition of the chair, and other physical or visual attributes of the chair. Additionally, the neural network model may also support fault detection that recognizes or otherwise identifies the chair is missing its front right leg based on the anomaly in the uploaded image 404. Using the case object metadata 132, the application server 102 and/or application platform 124 automatically populates or otherwise assigns values to the subject field, the description field, and the product name field using the characterized attributes, as illustrated in FIG. 5. The application server 102 and/or application platform 124 also automatically assigns or otherwise associates the new case record with the uploading user (e.g., setting a user ID field of the new case record to a value corresponding to the user's identifier). Additionally, the application server 102 and/or application platform 124 may utilize geotags associated with the uploaded image to automatically assign a street address or other geographic location information to the new case record.

As described above, the application server 102 and/or application platform 124 also obtains the case object validation rules 134 from the database 104 and applies the validation criteria to the various fields of the new case record and attempts to automatically populate or assign valid values to fields of the new case record that lack valid values after automatically populating fields based on the image characterization. In the illustrated embodiment, a case object validation rule 134 requires a value for a case identifier field, and the application server 102 and/or application platform 124 automatically assigns a case identifier value to the new case record based on existing case records associated with the user in the case object table 130. For example, the application server 102 and/or application platform 124 may analyze existing case identifiers for case records associated with the user, and assign the new case record with a unique case identifier, for example, by assigning the next available sequential case identifier value to the case identifier field. Another case object validation rule 134 requires a value for a case status field, and the application server 102 and/or application platform 124 automatically assigns the default open case status value to the case status field.

After automatically populating and assigning values to the fields of the new case record based on the characterized image attributes, the case object metadata 132, and the case object validation rules 134, the application server 102 and/or application platform 124 generates or otherwise provides the GUI display 500 including a graphical representation of the new case record. In the illustrated embodiment, the graphical representation of the new case record includes a list 502 of the values assigned to at least some of the fields of the case record and a thumbnail version 504 of the captured image 404. The assigned field values are depicted using text boxes or similar GUI elements 508 (e.g., drop-down menus for fields having a limited number of discrete valid values) configurable to allow a user to modify or overwrite the automatically assigned values to fields of the new case record. In some embodiments, GUI elements 508 associated with fields where the record creation process 200 failed to automatically assign a valid value may be rendered using a visually distinguishable characteristic (e.g., a red color, highlighting, or the like) to indicate required user input values for those fields of the new case record.

The user may utilize the new case record GUI display 500 on the client device 106 to review the autopopulated field values assigned by the record creation process 200 based on the uploaded image and modify any of the fields of the new case record as desired. When the user approves the assigned field values, the user selects or otherwise manipulates a button or similar GUI element 506 of the GUI display 500 to submit or otherwise save the new case record to the database 104. As described above, in response to receiving user input indicating confirmation of the new case record, the application server 102 and/or the application platform 124 stores the captured image 404 in the database 104 and creates a new entry in the case object table 130 corresponding to the captured image 404 and having columns or fields assigned with the autopopulated field values (subject to modification by the user) and a reference to the location where the captured image 404 is stored.

Figure 6:
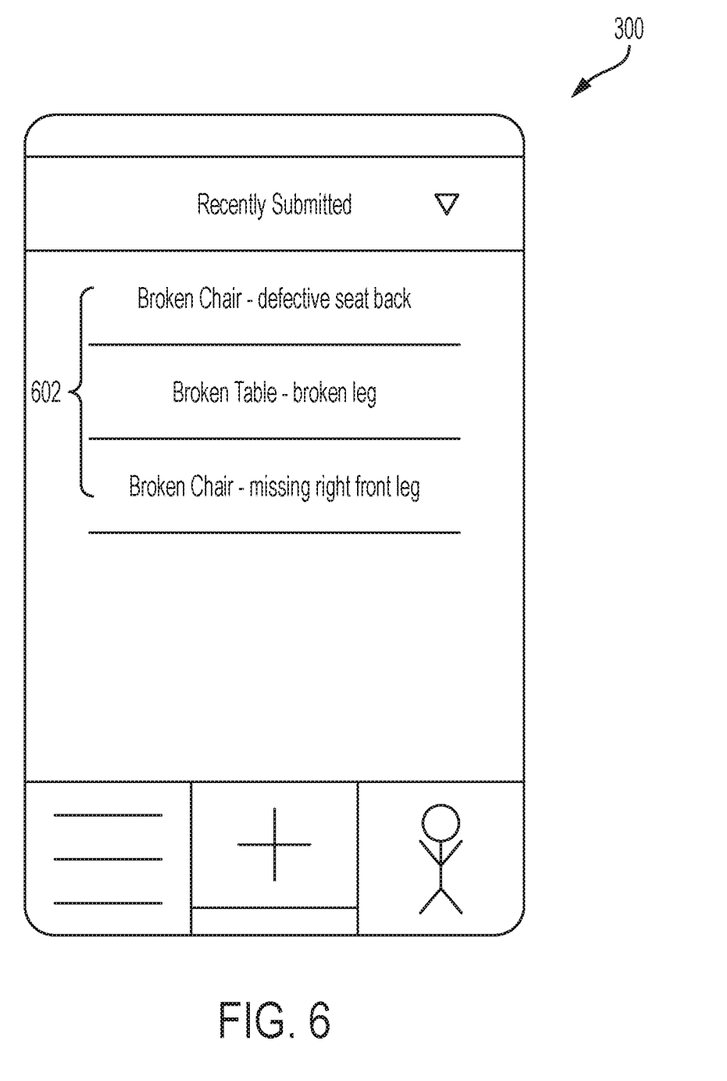

After creating a new case record corresponding to an uploaded image, the virtual application may update the GUI display on the client device 106 to revert to the case list GUI display 300 with an updated case list 602 that reflects the creation of the new case record, as illustrated in FIG. 6. Additionally, the application server 102 and/or the database 104 may automatically apply case workflows 136 to the new case record to automatically perform additional actions based on the values for one or more fields of the new case record.

For example, a case workflow 136 may be configured to automatically generate an order for replacement parts when a case record for a particular chair product has an open case status and values for one or more fields that indicate the part or component of the chair that is defective. Thus, in response to creating the new case record, the application server 102 and/or the database 104 may automatically create a new order database record for ordering a new front right leg for the chair depicted in the captured image 404. The new order database record may be autopopulated using fields of the new case database record, for example, by assigning the case ID to a case field of the new order record, the user ID to a user field of the new order record, and one or more address fields of the case record to corresponding address fields of the order record. In a similar manner as described above, a graphical representation of the order record may be presented on the client device 106 to allow the user to review, modify and/or confirm the new order.

As another example, a case workflow 136 may be configured to automatically assign the new case record to another user based on one or more fields of the new case record. For example, based on the identified product and type of defect depicted in the uploaded image 404, the autopopulated case record may be automatically assigned to service personnel that specialize in that type of defect and/or the identified product. In this regard, a task record, an appointment record, or the like could automatically be created that is associated with the assigned user (e.g., by setting a user field value to the user's unique identifier) and associated with the new case record (e.g., by setting the value of a case field to the case identifier or other unique identifier assigned to the new case). It should be noted that there are numerous different types of workflows that could be created and implemented in a manner that they are influenced by autopopulated field values, and the subject matter described herein is not intended to be limited to any particular type of workflow or action that may be performed in response to the record creation process 200. That is, a case workflow 136 may be configured to automatically create or otherwise generate one or more new records of any standard object type or custom object type supported by the application platform 124 and/or the database 104 and automatically associate those records in the database 104 with the new case record in the case object table 110.

Referring to FIGS. 1-6, in accordance with one or more embodiments, the artificial intelligence model(s) implemented by the application platform 124 and/or the image characterization application 126 are initially trained using a reference data set (e.g., a generic image model) to provide a foundational knowledge of likely image subjects and achieve adequate matching upon initial deployment, and then utilize machine learning to dynamically adapt or otherwise improve the training of the model in a manner that is tailored to a particular user, tenant, organization, or the like. For example, a neural network fault detection model may be trained using the subset of case records associated with the user of the client device 106 (and/or case records associated with that user's workgroup, tenant, organization, or the like) and corresponding subset of image data 138 to adapt the manner in which the neural network fault detection model maps particular anomalies in an image to a particular description or characterization of the image. Thus, if a user utilizes the GUI elements 508 of the case record GUI display 500 to modify the description field, the subject field, or the like for his or her case records to utilize certain terminology, verbiage, or phraseology for case records associated with images exhibiting a particular anomaly, the neural network fault detection model may be updated to characterize that anomaly in subsequently uploaded images from that user using the terminology, verbiage, or phraseology previously submitted or approved by the user. Accordingly, over time, the subject field, the description field, or other field may be autopopulated using user-specific (or tenant-specific) terminology, verbiage, or phraseology, thereby minimizing subsequent modifications by users in conjunction with future iterations of the record creation process 200.

Figure 7:
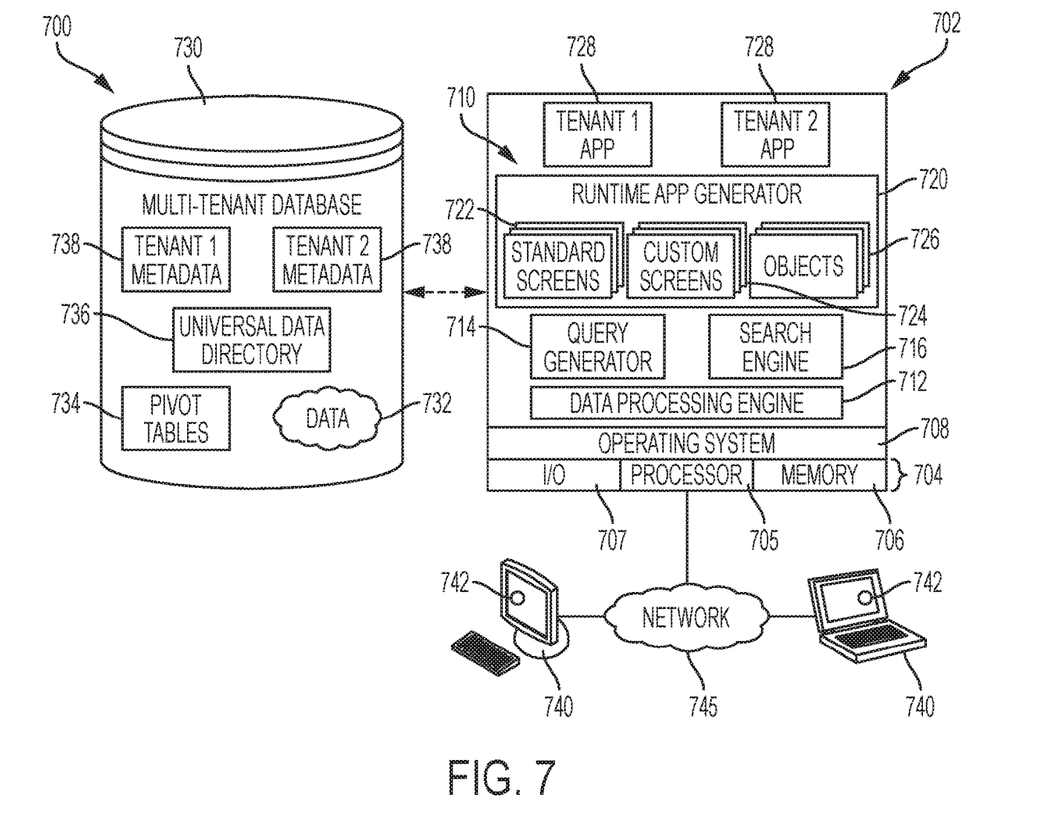
FIG. 7 is a block diagram of an exemplary multi-tenant system suitable for use with the computing system of FIG. 1 in accordance with one or more embodiments.

FIG. 7 depicts an exemplary embodiment of an on-demand multi-tenant database system 700 suitable for use in the database system 100 of FIG. 1 in conjunction with the record creation process 200 of FIG. 2. For example, the database system 100 could be realized an on-demand multi-tenant database system 700, with the application server (e.g., server 702) supporting an on-demand database 104 (e.g., database 730).

The illustrated multi-tenant system 700 of FIG. 7 includes a server 702 (e.g., application server 102) that dynamically creates and supports virtual applications 728 based upon data 732 from a common database 730 (e.g., database 104) that is shared between multiple tenants, alternatively referred to herein as a multi-tenant database. Data and services generated by the virtual applications 728 are provided via a network 745 (e.g., network 103) to any number of client devices 740 (e.g., client device 106), as desired. Each virtual application 728 is suitably generated at run-time (or on-demand) using a common application platform 710 (e.g., application platform 124) that securely provides access to the data 732 in the database 730 for each of the various tenants subscribing to the multi-tenant system 700. In accordance with one non-limiting example, the multi-tenant system 700 is implemented in the form of an on-demand multi-tenant customer relationship management (CRM) system that can support any number of authenticated users of multiple tenants.

As used herein, a "tenant" should be understood as referring to a group of one or more users that shares access to common subset of the data within the multi-tenant database 730. In this regard, each tenant includes one or more users associated with, assigned to, or otherwise belonging to that respective tenant. To put it another way, each respective user within the multi-tenant system 700 is associated with, assigned to, or otherwise belongs to a particular tenant of the plurality of tenants supported by the multi-tenant system 700. Tenants may represent customers, customer departments, business or legal organizations, and/or any other entities that maintain data for particular sets of users within the multi-tenant system 700 (i.e., in the multi-tenant database 730). For example, the application server 702 may be associated with one or more tenants supported by the multi-tenant system 700. Although multiple tenants may share access to the server 702 and the database 730, the particular data and services provided from the server 702 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

Still referring to FIG. 7, the server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728 that provide data and/or services to the client devices 740. In a typical embodiment, the application platform 710 gains access to processing resources, communications interfaces and other features of the processing hardware 704 using any sort of conventional or proprietary operating system 708. The virtual applications 728 are typically generated at run-time in response to input received from the client devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the client devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its client device 740, as appropriate.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant.

Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 726 such as "account" objects, "opportunity" objects, "contact" objects, or the like. The data 732 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled client device 740 on the network 745. In an exemplary embodiment, the client device 740 includes a display device, such as a monitor, screen, or another conventional electronic display capable of graphically presenting data and/or information retrieved from the multi-tenant database 730. Typically, the user operates a conventional browser application or other client program 742 (e.g., client application 107) executed by the client device 740 to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. As noted above, the virtual application 728 may contain Java, ActiveX, or other content that can be presented using conventional client software running on the client device 740; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, multi-tenancy, cloud computing, on-demand applications, machine learning, neural networks, fault detection, image classification, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein could essentially be realized as the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method comprising:
receiving, at a server coupled to a network, an image from an instance of a virtual application provided by the server to a client device coupled to the network;
analyzing, at the server, a subject of the image to characterize one or more physical attributes of the subject;
identifying, by the server, a first object type of a plurality of different types of objects supported by the virtual application to be created based on one or more of the characterized one or more physical attributes;
obtaining, by the server, metadata defining a structure of the first object type from a database coupled to the server;
identifying, by the server, one or more fields associated with the first object type to be populated utilizing the metadata to determine how to map the one or more physical attributes to the one or more fields associated with the first object type;
automatically populating, by the server, the identified one or more fields of a data record of the first object type corresponding to the image to reflect the characterized one or more physical attributes of the subject by mapping the one or more physical attributes to the identified one or more fields associated with the first object type;
obtaining, by the server, a validation rule associated with the first object type from the database;
after automatically populating the one or more fields, automatically setting a first field of the data record to a value determined based at least in part on the validation rule and at least one of the automatically populated one or more fields corresponding to the characterized one or more physical attributes of the subject;
storing the data record in the database;
obtaining, by the server, a workflow rule associated with the first object type corresponding to the data record from the database; and
automatically applying, by the server, the workflow rule to the data record in response to storing the data record to create a second data record having a different object type in the database based at least in part on at least one of the automatically populated one or more fields of the data record.

2. The method of claim 1, wherein analyzing the subject of the image comprises providing the image to an artificial neural network characterizing at least one of the one or more physical attributes of the subject.

3. The method of claim 1, further comprising training the artificial neural network using a plurality of images stored in the database in association with at least one of a user of the client device, a tenant associated with the user of the client device, and an organization associated with the user of the client device.

4. The method of claim 1, wherein:
analyzing the subject of the image comprises identifying a physical defect associated with the subject of the image using a fault detection algorithm; and
automatically populating the one or more fields comprises describing the physical defect in a first field of the one or more fields.

5. The method of claim 1, further comprising:
determining, at the server, the value for the first field of the one or more fields based at least in part on the metadata and at least one of the one or more physical attributes.

6. A non-transitory computer-readable medium having instructions stored thereon that are executable by a processing system of the server to perform the method of claim 1.

7. The method of claim 1, wherein:
analyzing the subject of the image comprises performing at least one of object detection, object recognition, and object classification on the image to identify the subject of the image; and
automatically populating the one or more fields comprises automatically setting a subject field of the data record to indicate the subject.

8. The method of claim 1, wherein the server comprises an application server comprising an application platform to provide the instance of the virtual application at the client device based at least in part on data maintained in the database, wherein the first object type and the different object type are supported by the application platform for integration into the virtual application.

9. The method of claim 1, wherein automatically setting the first field comprises automatically assigning an identifier value to the data record based on existing data records of the first object type.

10. The method of claim 1, wherein automatically setting the first field comprises automatically assigning a default status value to a status field of the data record.

11. A computer-implemented method of automatically creating cases in a database system, the method comprising:
obtaining, at an application server coupled to a network, media content uploaded from an instance of a virtual application provided by the application server to a client device coupled to the network;
characterizing, at the application server, one or more physical attributes of a subject of the media content;
identifying, by the application server, a case database object type of a plurality of different types of objects supported by the virtual application to be created based on one or more of the characterized one or more physical attributes;
obtaining, by the application server, metadata defining a structure of the case database object type from a database coupled to the application server;
identifying, by the application server, one or more fields associated with the case database object type to be populated utilizing the metadata to determine how to map the one or more physical attributes to the one or more fields associated with the case database object type;
automatically populating, by the application server, the one or more fields of a case record corresponding to the media content to indicate the one or more physical attributes by mapping the one or more physical attributes to the identified one or more fields associated with the case database object type, the case record corresponding to the case database object type;
obtaining, by the application server, a validation rule associated with the case database object type from the database;
after automatically populating the one or more fields of the case record, automatically setting a first field of the case record to a value determined based at least in part on the validation rule and at least one of the automatically populated one or more fields corresponding to the characterized one or more physical attributes of the subject;
providing, by the application server, a graphical representation of the case record at the client device;

storing, by the application server, the case record in the database coupled to the application server;

obtaining, by the application server, a workflow rule associated with the case database object type from the database; and automatically applying, by the application server, the workflow rule to the case record in response to storing the case record to create a second data record having a different database object type in the database based at least in part on at least one of the automatically populated fields of the case record.

12. The method of claim 11, further comprising storing the media content in the database in association with the case record.

13. The method of claim 11, the media content comprising an image, wherein characterizing the physical attributes of the subject of the image comprises providing the image to an artificial neural network.

14. The method of claim 13, further comprising training the artificial neural network based at least in part on one or more existing case records in the database associated with a user of the client device prior to characterizing the physical attributes.

15. The method of claim 13, wherein the artificial neural network detects a fault within the image, wherein automatically populating the one or more fields comprises automatically populating at least one of a subject field of the case record and a description field of the case record with text describing the fault.

16. The method of claim 15, wherein automatically applying the workflow rule to the case record to create the second data record comprises automatically creating an order record in the database associated with the case record based at least in part on the at least one of the subject field of the case record and the description field of the case record in response to storing the case record in the database.

17. The method of claim 11, wherein the graphical representation of the case record indicates the automatically populated one or more fields of the case record.

18. A system comprising:

a data storage to maintain a table of records having a database object type, metadata associated with the database object type, a validation rule associated with the database object type and a workflow rule associated with the database object type; and a server computing device coupled to the data storage and a network to receive media content from an instance of a virtual application provided via the network, characterize one or more physical attributes of a subject of the media content, identify the database object type of a plurality of different types of objects supported by the virtual application to be created based on one or more of the characterized one or more physical attributes, obtain the metadata defining a structure of the database object type, identify one or more fields associated with the database object type to be populated utilizing the metadata to determine how to map the one or more physical attributes to the one or more fields associated with the first object type, automatically populate the one or more fields of a new record of the database object type based at least in part on the characterized one or more physical attributes and the metadata by mapping the one or more physical attributes to the identified one or more fields, automatically set a first field of the new record to a value determined based at least in part on the validation rule and at least one of the automatically populated one or more fields corresponding to the characterized one or more physical attributes of the subject after automatically populating the one or more fields, store the new record in the table in association with the media content, and automatically apply the workflow rule to the new record in response to storing the new record to create a second data record having a different database object type in the database based at least in part on at least one of the automatically populated one or more fields of the data record.

19. The system of claim 18, wherein:

the server computing device includes an artificial intelligence model;

the media content is input to the artificial intelligence model; and the one or more physical attributes comprise a characterization of a physical defect associated with the subject detected within the media content.

20. The system of claim 19, wherein the artificial intelligence model is trained using a subset of the table of records associated with a user of the client device.

* * * * *